May 13, 1958      A. HUGHES      2,834,575
POWER AND TRANSMISSION ASSEMBLY FOR DRILLING RIGS
Filed April 19, 1954
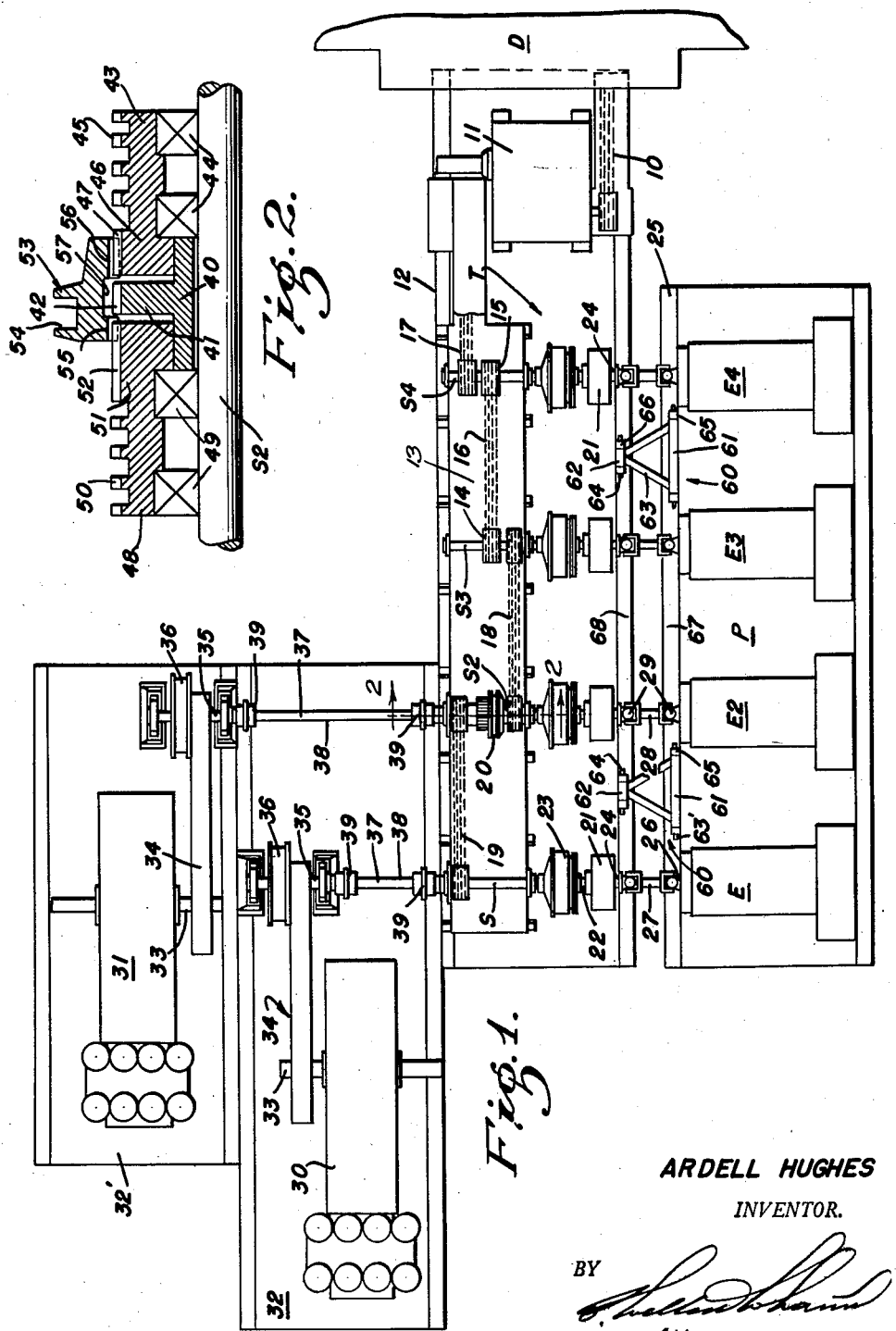
ARDELL HUGHES
INVENTOR.
BY
Attorney United States Patent Office 2,834,575
Patented May 13, 1958

2,834,575

POWER AND TRANSMISSION ASSEMBLY FOR DRILLING RIGS

Ardell Hughes, South Gate, Calif., assignor, by mesne assignments, to The Youngstown Sheet and Tube Company Application April 19, 1954, Serial No. 424,135

4 Claims. (Cl. 255—19)

This invention relates to means for driving the mechanisms, such as drawworks and mud pumps, of oil well drilling rigs.

One of the objects of the invention is to provide power and transmission means for oil well drilling rigs which lends itself readily to portability, even though the equipment may be of large horsepower, without the necessity of an extensive disassembly or detaching of component parts in order to make portability of the equipment possible.

It is an object of the invention to provide power and transmission means for well drilling rigs comprising a compounding transmission assembly on one support arranged to be driven by a plurality of engines disposed in side by side relation upon a separate support, the compounding transmission assembly having a plurality of shafts in spaced, parallel relation arranged to be selectively interconnected by clutch and chain and sprocket, there being torque converters mounted on the first support adjacent like ends of the shafts and being connectible to the shafts through clutches. The second support has the engines mounted thereon in approximate alignment with the torque converters and the power output members of the engines are connected to the power input members of the torque converters by the flexible shaft means. In this arrangement two separate assemblies, namely, the compound transmission assembly and the engine assembly, are provided of a size to be separately moved over the roadways. However, in this arrangement, torque converters are provided, yet the arrangement is such that any one or several of the engines may be disconnected from service without danger of misuse of the torque converter or converters associated therewith in view of the placement of clutches between the torque converters and the lateral shafts of the compound transmission unit or assembly. A feature of this invention is that there can be no multiplication of the torque applied to the respective flexible connections which are driven directly by the engine and thereby receive only the torque of the engine. Herein the term "torque converter" is used in its broad sense to mean a device which receives power at relatively low torque and high velocity of shaft rotation and transforms the same to a delivered power of relatively high torque and low velocity of shaft rotation.

A further object of the invention is to provide a driving means for drilling rigs comprising a transmission unit having a plurality of power receiving shafts and a separate engine unit including a plurality of power output shafts approximately aligned with the power receiving shafts when the two units are placed in side-by-side relation, there being flexible-jointed shaft connections between the power output shafts of the engine unit and the power receiving shafts of the transmission unit. A further object of the invention is to set forth an arrangement of units such as described in the foregoing having linkage means connecting the units so as to hold them in approximately parallel relation but permitting relative movement or small disalignment.

A further object of the invention is to provide a simple arrangement whereby the mud pumps may be driven from the first and second shafts of the compound transmission unit. These mud pumps have their own supporting means and when disconnected from the transmission unit, may be readily transported.

Further objects and advantages of the invention may be brought out in the following part of the specification wherein the explanation of details has been for the purpose of disclosure without intending to limit the scope of the invention which is set forth in the accompanying claims. Referring to the accompanying drawings which are for illustrative purposes only:

Fig. 1 is a schematic plan view of the invention; and

Fig. 2 is an enlarged fragmentary sectional view taken as indicated by the line 2—2 of Fig. 1.

In Fig. 1, I show a portion of a drawworks D which is supported upon its own sub-base so that it may be transported as an independent unit. This drawworks is arranged to be driven by chains 10 from a selective speed and reverse gear mechanism 11 which forms a part of the compound transmission unit or assembly T supported so that it will extend outwardly away from the drawworks D.

The compound transmission unit T has a fabricated skid or base support 12 of elongated rectangular form. Thereon a transmission case 13 is mounted in longitudinally extending positoin. This transmission case 13 supports transverse shafts S, S2, S3 and S4 which are connected in compounding relation by chain, sprocket and clutch means. For example, shafts S3 and S4 are connected by power transmission means comprising sprockets 14 and 15, with chains 16 running thereover. The shaft S4 is arranged to drive the selective speed and reversing gear mechanism 11 through chain and sprocket means 17. Shaft S3 may be connected to either or both of shafts S and S2 through chain and sprocket means 18 and 19 and the intervening composite clutch mechanism 20 which is mounted on shaft S2.

Power transmission devices 21, characterized by slippage, are mounted on the support 12 in operative alignment with the shafts S, S2, S3 and S4. These devices 21 in the present practice of the invention are torque converters having their output members 22 connected through clutches 23 with the respective shafts S, S2, S3 and S4. The input members or shafts 24 of the torque converters 21 are faced outwardly at one side of the unit T.

An independent base or support 25 is arranged along the support 12 adjacent the torque converters 21. Four internal combustion engines E, independently identified as engines E, E2, E3 and E4, are mounted on the support 25 in operative alignment with the torque converters 21, and the output members 26 of the engines E are connected by flexible shaft means 27 with the input members 24 of the torque converters 21. The flexible shaft members 27 each comprise a shaft portion 28 with universal joints 29 at the opposite ends thereof for connection to the shaft elements 24 and 26. In this arrangement the engines are mounted with reasonable accuracy upon the separate support 25. The expected variance in the alignment of the shaft members 24 and 26 is compensated for by the flexible shaft means 27. Also, the size of the engine unit is kept within such limits that it will have satisfactory road clearance and therefore may be transported over public highways to selected drilling locations. The placement of the clutches 23 and the torque converters 21 on the support 12 so as to be included as part of the compound transmission unit T gives a satisfactory distribution of weight between the separate transmission and engine or power units.

Mud pumps 30 and 31 are mounted on supporting means 32 and 32' which may be arranged adjacent the end of the compound transmission unit T and opposite from the power unit P. These pumps 30 and 31 have crankshafts 33 which are connected by belt and pulley means 34 with jackshafts 35 which are mounted on the supports 32 and 32' approximately in alignment with the first and second transmission shafts S and S2. Air operated clutches 36 are arranged upon the shafts 35 to connect the same with the belt and pulley means 34. The jackshafts 35 are respectively connected by flexible shaft means 37 each comprising a shaft portion 38 with universal couplings 39 at the opposite ends thereof, respectively to the transmission shafts S and S2 whereby the pumps may be driven respectively by the engines E, E2, or by a selected number of the engines provided proper adjustments of the transmission means are made. The described equipment, when transportation thereof is desired, may be separated into five individual units of such size that they may be readily transported over the highways, these individual units consisting of the drawworks, the transmission unit, the power or engine unit P and the two pump units.

The composite clutch mechanism, shown in partial section in Fig. 2, is fully explained in the copending application, Serial No. 130,532 of V. H. Hanes, eventually Patent No. 2,672,768, for Compounding Transmission and Clutch Assembly Therefor, filed December 1, 1949. As shown in Fig. 2, an annular clutch body 40 is keyed on the intermediate portion of the shaft S2, this body 40 having an annular portion 41 with peripheral clutch teeth 42. On one side of the clutch body 40 there is a clutch body 43 rotatably supported on the shaft S2 by bearings 44, the body 43 has sprocket teeth 45 to engage the chains of the chain and sprocket means 18. The portion of the rotatable body 43 adjacent the body 40 has clutch teeth or splines 47 thereof.

A similar quill or body 48 is positioned on the opposite side of the member 40 and is rotatably supported on the shaft S2 by bearings 49. This clutch body is provided on its exterior surface with sprocket teeth 50, and adjacent the body 40 has clutch teeth or splines 52. The clutch mechanism 20 has an annular overriding clutch member 53 with internal clutch teeth 55 and 56 to cooperate with the clutch teeth 42, 47 and 52. In Fig. 2, the movable clutch member 53 is shown in an intermediate position wherein the clutch body 40 may revolve freely within the clutch members 43 and 48. At this time, accordingly, rotation of the shaft S2 will not be transmitted through the interconnecting transmission parts 18 and 19 to adjacent shafts, S3 and S. By shifting the movable clutch member 53 axially in one direction or the other, the rotatable clutch body 40 may be connected with either or both of the clutch bodies 43 and 48. By the arrangement shown it is possible to use all or a part of the engines to drive the drawworks or the pumps.

Link means 60 connect the units P and T in approximately parallel relation. Each of these link means 60 comprises a pair of parallel tubes 61 and 62 connected by bars 63. The bars 61 and 62 are loosely connected to the longitudinal beams of the units P and T by pins 63' and 64 which pass through the tube 61 and 62 and through lugs or brackets 65 which are welded onto the longitudinal beams 67 and 68 of the units P and T. The link means 60 hold the units P and T in approximate alignment, but permit a small relative movement of the units which may continue to operate satisfactorily even though there may be some limited settling of the foundation or earth upon which either of the units is supported.

I claim:

1. In a portable power and transmission assembly for driving the drawworks of a drilling rig: a portable transmission unit having an elongated base, a plurality of laterally directed shafts spaced lengthwise of said base, transmission means connecting said shafts and transmission means for connecting at least one of said shafts to said drawworks, a plurality of torque converters spaced along one side of said base in spaced relation to like ends of said shafts, clutches between said shafts and said torque converters for connecting the output members of said torque converters respectively to said shafts; a portable power unit arranged along the torque converter side of said base, said power unit having an elongated base with one edge thereof adjacent said base of said transmission unit, a plurality of engines spaced along said base in alignment with said torque converters; flexible shaft means connecting the output members of said engines with the input members of said torque converters; and links connecting the adjacent edges of said bases so that the base of said power unit may have up and down adjusting movement relative to said base of said transmission unit, said links being characterized by having horizontal hinge means at the ends thereof connecting said links to said bases.

2. In a portable power and transmission assembly for driving the drawworks of a drilling rig: a portable transmission unit having an elongated base, a plurality of laterally directed shafts spaced lengthwise of said base, transmission means connecting said shafts and transmission means for connecting at least one of said shafts to said drawworks, a plurality of torque converters spaced along one side of said base in spaced relation to like ends of said shafts, clutches between said shafts and said torque converters for connecting the output members of said torque converters respectively to said shafts; a portable power unit arranged along the torque converter side of said base, said power unit having an elongated base with one edge thereof adjacent said base of said transmission unit, a plurality of engines spaced along said base in alignment with said torque converters; flexible shaft means connecting the output members of said engines with the input members of said torque converters; links connecting the adjacent edges of said bases so that the base of said power unit may have up and down adjusting movement relative to said base of said transmission unit, said links being characterized by having horizontal hinge means at the ends thereof connecting said links to said bases; a pair of pump units disposed on the opposite side of said transmission unit from said power unit; and flexible shaft elements connecting shafts of said transmission to the power receiving members of said pump units.

3. In a portable power and transmission assembly for driving the drawworks of a drilling rig: a portable transmission unit having an elongated base, a plurality of laterally directed shafts spaced lengthwise of said base, transmission means connecting said shafts and transmission means for connecting at least one of said shafts to said drawworks, a plurality of torque converters spaced along one side of said base in spaced relation to like ends of said shafts, clutches between said shafts and said torque converters for connecting the output members of said torque converters respectively to said shafts; a portable power unit arranged along the torque converter side of said base, said power unit having an elongated base with one edge thereof adjacent said base of said transmission unit, a plurality of engines spaced along said base in alignment with said torque converters; flexible shaft means connecting the output members of said engines with the input members of said torque converters; and links connecting the adjacent edges of said bases so that the base of said power unit may have up and down adjusting movement relative to said base of said transmission unit.

4. In a portable power and transmission assembly for driving the drawworks of a drilling rig: a portable transmission unit having an elongated base, a plurality of laterally directed shafts spaced lengthwise of said base, transmission means connecting said shafts and transmission means for connecting at least one of said shafts to said drawworks, a plurality of torque converters spaced along one side of said base in spaced relation to like ends of said shafts, clutches between said shafts and said torque converters for connecting the output members of said torque converters respectively to said shafts; a portable power unit arranged along the torque converter side of said base, said power unit having an elongated base with one edge thereof adjacent said base of said transmission unit, a plurality of engines spaced along said base in alignment with said torque converters; flexible shaft means connecting the output members of said engines with the input members of said torque converters; links connecting the adjacent edges of said bases so that the base of said power unit may have up and down adjusting movement relative to said base of said transmission unit; a pair of pump units disposed on the opposite side of said transmission unit from said power unit; and flexible shaft elements connecting shafts of said transmission to the power receiving members of said pump units.

References Cited in the file of this patent

UNITED STATES PATENTS

| | | |
|---|---|---|
| 2,204,877 | Anderson | June 18, 1940 |
| 2,243,156 | Howe et al. | May 27, 1941 |
| 2,488,069 | Spalding | Nov. 15, 1949 |
| 2,541,625 | Webster | Feb. 13, 1951 |
| 2,576,872 | Young | Nov. 27, 1951 |
| 2,613,059 | Maier et al. | Oct. 7, 1952 |
| 2,672,768 | Hanes | Mar. 23, 1954 |